United States Patent
Donadel et al.

(10) Patent No.: US 9,212,910 B2
(45) Date of Patent: Dec. 15, 2015

(54) MICROELECTROMECHANICAL GYROSCOPE WITH SELF-CALIBRATION FUNCTION AND METHOD OF CALIBRATING A MICROELECTROMECHANICAL GYROSCOPE

(71) Applicant: STMicroelectronics S.r.l., Agrate Brianza (IT)

(72) Inventors: Andrea Donadel, Meda (IT); Tommaso Ungaretti, Pavia (IT); Carlo Caminada, Pregnana Milanese (IT); Luciano Prandi, Bellinzago Novarese (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 539 days.

(21) Appl. No.: 13/648,215

(22) Filed: Oct. 9, 2012

(65) Prior Publication Data

US 2013/0031950 A1     Feb. 7, 2013

Related U.S. Application Data

(63) Continuation of application No. 13/558,253, filed on Jul. 25, 2012, now abandoned.

(30) Foreign Application Priority Data

Jul. 28, 2011   (IT) ............................. TO2011A0688

(51) Int. Cl.
   *G01C 15/14*   (2006.01)
   *G01P 3/44*    (2006.01)
   *G01C 19/5776* (2012.01)

(52) U.S. Cl.
   CPC ................................. *G01C 19/5776* (2013.01)

(58) Field of Classification Search
   None
   See application file for complete search history.

(56) References Cited

U.S. PATENT DOCUMENTS 6,230,563 B1 * 5/2001 Clark et al. ................ 73/504.04
6,845,669 B2 * 1/2005 Acar et al. ................. 73/504.14

(Continued)

FOREIGN PATENT DOCUMENTS

EP   2 259 019 A1   12/2010

OTHER PUBLICATIONS

Antonello et al., "Open loop Compensation of the Quadrature Error in MEMS Vibrating Gyroscopes," $35^{th}$ Annual Conference of IEEE Industrial Electronics, pp. 4034-4039, Nov. 3-5, 2009, 7 pages.

*Primary Examiner* — Peter Macchiarolo
*Assistant Examiner* — Jermaine Jenkins
(74) *Attorney, Agent, or Firm* — Seed IP Law Group PLLC

(57) ABSTRACT

A microelectromechanical gyroscope having a supporting structure; a mass capacitively coupled to the supporting structure and movable with a first degree of freedom and a second degree of freedom, in response to rotations of the supporting structure about an axis; driving components, for keeping the mass in oscillation according to the first degree of freedom; a read interface for detecting transduction signals indicating the capacitive coupling between the mass and the supporting structure; and capacitive compensation modules for modifying the capacitive coupling between the mass and the supporting structure. Calibration components detect systematic errors from the transduction signals and modify the capacitive compensation modules as a function of the transduction signals so as to attenuate the systematic errors.

24 Claims, 7 Drawing Sheets

(56) References Cited

U.S. PATENT DOCUMENTS

| | | |
|---|---|---|
| 6,860,150 B2 * 3/2005 | Cho | 73/504.12 |
| 6,860,151 B2 * 3/2005 | Platt et al. | 73/504.16 |
| 7,043,987 B2 * 5/2006 | Jeong et al. | 73/504.12 |
| 7,051,590 B1 * 5/2006 | Lemkin et al. | 73/504.04 |
| 7,240,533 B2 * 7/2007 | Fell et al. | 73/1.38 |
| 8,037,757 B2 * 10/2011 | Johnson | 73/504.12 |
| 8,096,179 B2 * 1/2012 | Bien et al. | 73/504.02 |
| 8,443,665 B2 * 5/2013 | Hsu | 73/504.12 |
| 8,667,842 B2 * 3/2014 | Prandi | 73/504.12 |
| 8,857,259 B2 * 10/2014 | Hsu et al. | 73/504.12 |
| 2007/0163815 A1 * 7/2007 | Ungaretti et al. | 178/18.06 |
| 2008/0282833 A1 11/2008 | Chaumet | |
| 2009/0241662 A1 * 10/2009 | Supino et al. | 73/504.12 |
| 2013/0341737 A1 * 12/2013 | Bryzek et al. | 257/415 |
| 2014/0007681 A1 * 1/2014 | Lin | 73/504.12 |

* cited by examiner

MICROELECTROMECHANICAL GYROSCOPE WITH SELF-CALIBRATION FUNCTION AND METHOD OF CALIBRATING A MICROELECTROMECHANICAL GYROSCOPE

BACKGROUND

1. Technical Field

The present disclosure relates to a microelectromechanical gyroscope with a self-calibration function and to a method for calibrating a microelectromechanical gyroscope.

2. Description of the Related Art

As is known, the use of microelectromechanical systems (MEMS) has become increasingly widespread in various sectors of technology and has yielded encouraging results especially in the production of inertial sensors, microintegrated gyroscopes, and electromechanical oscillators for a wide range of applications.

MEMS of this type are usually based upon microelectromechanical structures comprising at least one mass connected to a fixed body (stator) by springs and movable with respect to the stator according to pre-set degrees of freedom. The movable mass and the stator are capacitively coupled through a plurality of respective comb-fingered electrodes facing one another so as to form capacitors. The movement of the movable mass with respect to the stator, for example on account of an external stress, modifies the capacitance of the capacitors, whence it is possible to trace back to the relative displacement of the movable mass with respect to the fixed body and hence to the force applied. Instead, by supplying appropriate biasing voltages, it is possible to apply an electrostatic force to the movable mass to set it in motion. Furthermore, to obtain electromechanical oscillators, the frequency response of the inertial MEMS structures is exploited, which is typically of a second-order lowpass type, with a resonance frequency.

In particular, MEMS gyroscopes have a more complex electromechanical structure, which comprises two masses that are movable with respect to the stator and coupled together so as to have a relative degree of freedom. The two movable masses are both capacitively coupled to the stator. One of the masses is dedicated to driving and is kept in oscillation at the resonance frequency. The other mass is drawn along in the oscillatory (translational or rotational) motion and, in the event of rotation of the microstructure with respect to a pre-set gyroscopic axis with an angular velocity, it is subject to a Coriolis force proportional to the angular velocity itself. In practice, the mass that is drawn along, which is capacitively coupled to the fixed body through electrodes, as likewise the driving mass, operates as an accelerometer that enables detection of the Coriolis force and acceleration and hence tracing back to the angular velocity.

As already mentioned, the structure of MEMS gyroscopes is rather complex and, among other things, the exact configuration of the masses and of the electrodes necessary for driving and sensing affects the capacitive coupling. In practice, inevitable imperfections due to process spread result in systematic errors that alter the results of the measurements. For instance, a defect in the elastic suspension elements that constrain the masses to the stator can cause a displacement with respect to the theoretical resting position and hence an unbalancing of the capacitances. The systematic unbalancing due to the process spread (offset) carries, however, a considerable weight and as a rule has a much greater effect than the unbalancing caused by the measured quantity (in particular, an angular velocity). Even though the offset is translated in frequency by demodulation and subsequently filtered, the dynamics of the components that intervene in the processing prior to filtering is severely limited. In other words, the dynamics is almost saturated by the offset, and the fraction available for the signal is consequently compressed. Furthermore, even when the dynamics available for the useful signal is sufficient, the demodulation and filtering cannot cause total suppression of the contribution of offset, which presents in a form similar to the noise on the output. Also this aspect may seriously limit the use of microelectromechanical gyroscopes, especially for applications where an extremely low level of noise is required.

For this reason, gyroscopes are calibrated in the factory using auxiliary capacitances having a variable value, which is selected so as to compensate for the offsets.

This solution is not, however, satisfactory, because the offsets linked to the structure, especially due to capacitive unbalancing, are not stable and depend to a large extent upon the conditions, in particular the temperature. Even just the thermal stresses during the steps of soldering of the devices can cause important drifts and annuls the effect of calibration. In the same way, variations of temperature in use with respect to the calibration conditions may modify the offset and alter the measurements, introducing systematic errors. Another factor that can affect the offset to a considerable extent is ageing.

BRIEF SUMMARY

The present disclosure provides a microelectromechanical gyroscope and a method for calibrating a microelectromechanical gyroscope that enable the limitations described above to be overcome and, in particular, attenuation of at least some of the systematic errors that can present during the service life of the device.

One embodiment of the present disclosure is a microelectromechanical gyroscope that includes a supporting structure having sensing terminals and a sensing mass coupled to the supporting structure through capacitive coupling, the sensing terminals being configured to detect a capacitance between the sensing mass and the supporting structure, the sensing mass being movable with respect to the supporting structure according to a first degree of freedom and being movable with respect to the supporting structure according to a second degree of freedom in response to rotations of the supporting structure about an axis. The gyroscope includes driving components configured to maintain the sensing mass in oscillation according to the first degree of freedom, a reading interface connected to the sensing terminals and configured to sense transduction signals indicative of the capacitance between the sensing mass and the supporting structure, capacitive compensation modules connectable to the sensing terminals and configured to modify the capacitive coupling between the sensing mass and the supporting structure, and calibration components coupled to the reading interface and configured to detect systematic errors from the transduction signals and to modify the capacitive compensation modules as a function of the transduction signals to mitigate the systematic errors.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
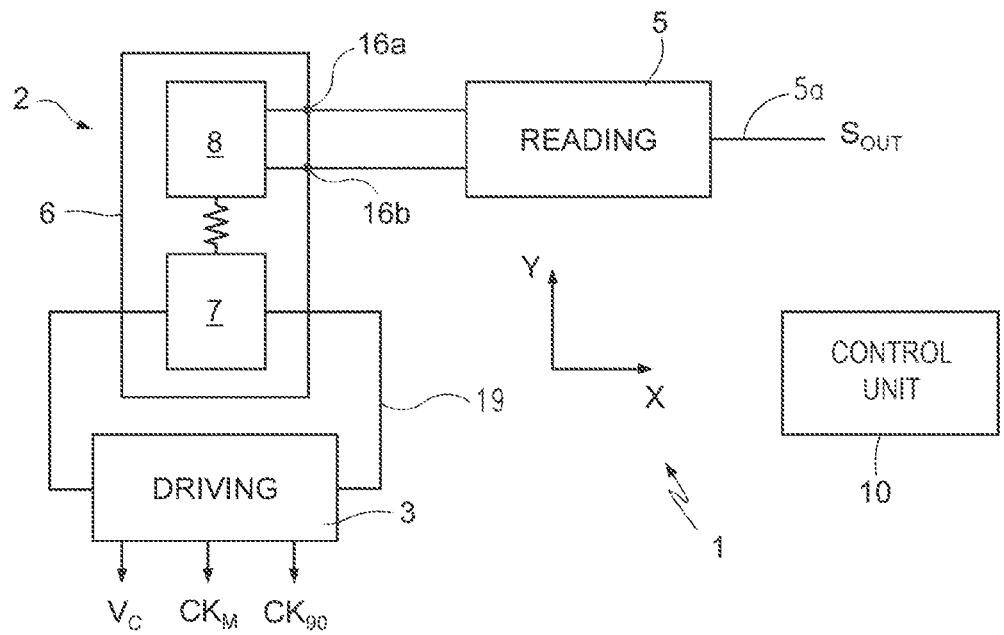
FIG. 1 is a simplified block diagram of a microelectromechanical gyroscope in accordance with one embodiment of the present disclosure.

FIG. 1 shows as a whole a microelectromechanical gyroscope 1, which comprises a microstructure 2, of a semiconductor material, a driving device 3, a reading generator 4, a reading device 5, and a control unit 10.

The microstructure 2 is made of a semiconductor material and comprises a supporting structure 6, a driving mass 7, and at least one sensing mass 8. For reasons of simplicity, in the embodiment illustrated herein reference will be made to the case of a uniaxial gyroscope, in which only one sensing mass 8 is present. What is described hereinafter applies, however, also to the case of multiaxial gyroscopes, which comprise two or more sensing masses or systems of sensing masses, for detection of rotations according to respective independent axes.

The driving mass 7 is elastically constrained to the supporting structure 6 so as to be able to oscillate about a resting position according to a translational or rotational degree of freedom. The sensing mass 8 is mechanically coupled to the driving mass 7 so as to be drawn along in motion according to the degree of freedom of the driving mass 7 itself. Furthermore, the sensing mass 8 is elastically constrained to the driving mass 7 so as to oscillate in turn with respect to the driving mass 7 itself, with a respective further degree of freedom.

In the embodiment described herein, in particular, the driving mass 7 is linearly movable along a driving axis X, whereas the sensing mass 8 is movable with respect to the driving mass 7 according to a sensing axis Y perpendicular to the driving axis X. It is understood, however, that the type of motion (translational or rotational) allowed by the degrees of freedom and the arrangement of the driving and sensing axes may vary according to the type of gyroscope. With reference to the movements of the driving mass 7 and of the sensing mass 8, moreover, the expression "according to an axis" will henceforth be indifferently used to indicate movements along an axis or about an axis, according to whether the movements allowed for the masses by the respective degrees of freedom are translational (along an axis) or else rotational (about an axis), respectively. Likewise, the expression "according to a degree of freedom" will be indifferently used to indicate translational or rotational movements, as allowed by said degree of freedom.

Furthermore, the driving mass 7 (with the sensing mass 8) is connected to the supporting structure 6 so as to define a resonant mechanical system with a resonance frequency $\omega_R$ (according to the driving axis X).

Figure 2:
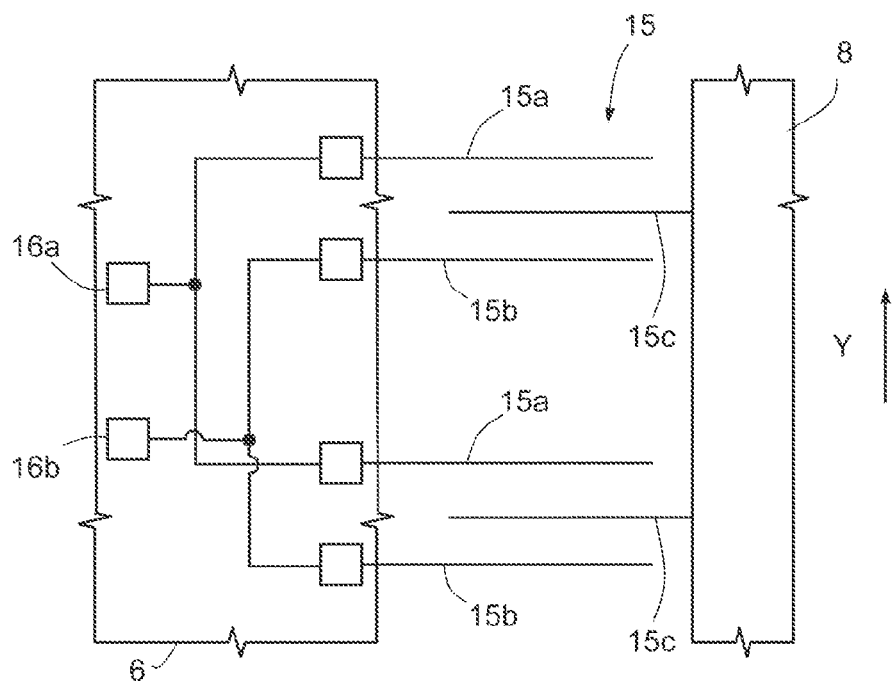
FIG. 2 is a top plan view of an enlarged detail of gyroscope of FIG. 1.

The sensing mass 8 is electrically connected to the driving mass 7, without interposition of insulating structures. Consequently, the sensing mass 8 and the driving mass 7 are at the same potential. The sensing mass 8 is moreover capacitively coupled to the supporting structure 6 through signal sensing units 15 (FIG. 2). More precisely, the signal sensing units 15 comprise first and second fixed sensing electrodes 15a, 15b, anchored to the supporting structure 6, and movable sensing electrodes 15c, anchored to the sensing mass 8 and arranged between respective first fixed sensing electrodes 15a and second fixed sensing electrodes 15b. The capacitive coupling is of a differential type and is obtained by parallel plate electrodes, perpendicular to the sensing direction Y. In addition, the first and second fixed sensing electrodes 15a, 15b of the signal sensing units 15 are electrically connected, respectively, to a first signal sensing terminal 16a and to a second signal sensing terminal 16b of the microstructure 2. In practice, the sensing mass 8 is coupled to the signal sensing terminals 16a, 16b through signal sensing differential capacitances $C_{SS1}$, $C_{SS2}$.

The driving device 3, which is provided, for example, as described in the document No. EP-A-2 259 019, filed in the name of the same present applicant, is connected to the microstructure 2 so as to form, with the driving mass 7, a microelectromechanical loop 19. The driving device 3 is configured to keep the microelectromechanical loop 19 in oscillation with controlled amplitude, at a driving frequency $\omega_D$ close to the resonance frequency $\omega_R$ of the mechanical system defined by the driving mass 7 (with the sensing mass 8) connected to the supporting structure 6. Furthermore, the driving device 3, for example by using a phase-locked-loop circuit (not illustrated herein), supplies a carrier signal $V_C$, a master clock signal $CK_M$ and a quadrature clock signal $CK_{90}$. The carrier signal $V_C$ has a frequency equal to the driving frequency $\omega_D$ and is in phase with the oscillations of the microelectromechanical loop 19. The master clock signal $CK_M$ and the quadrature clock signal $CK_{90}$ are square-wave signals of a frequency equal to the driving frequency $\omega_D$.

The master clock signal $CK_M$ is in phase with the oscillations of the driving mass 7, whereas the quadrature clock signal $CK_{90}$ is phase-shifted by 90°.

The reading device 5 is of the discrete-time open-loop type and, in the embodiment described herein, is configured to perform a so-called "double-ended" reading of the displacements of the sensing mass 8 according to the respective degree of freedom (in particular, for detection of a position of the sensing mass along the sensing axis Y). In particular, the reading device 5 has inputs connected to the signal sensing terminals 16a, 16b of the microstructure 2 and an output 5a, supplying an output signal $S_{OUT}$, correlated to the angular velocity of the microstructure 2.

Figure 3:
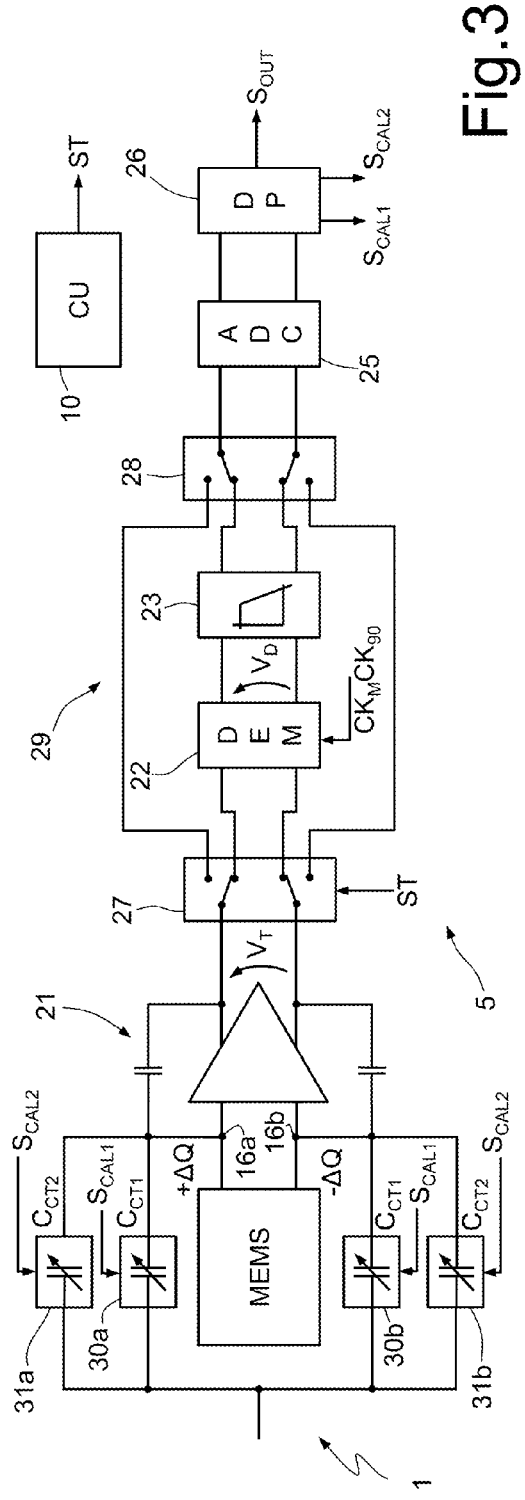
FIG. 3 is a more detailed block diagram of the gyroscope of FIG. 1 in a first operating configuration.
Figure 4:
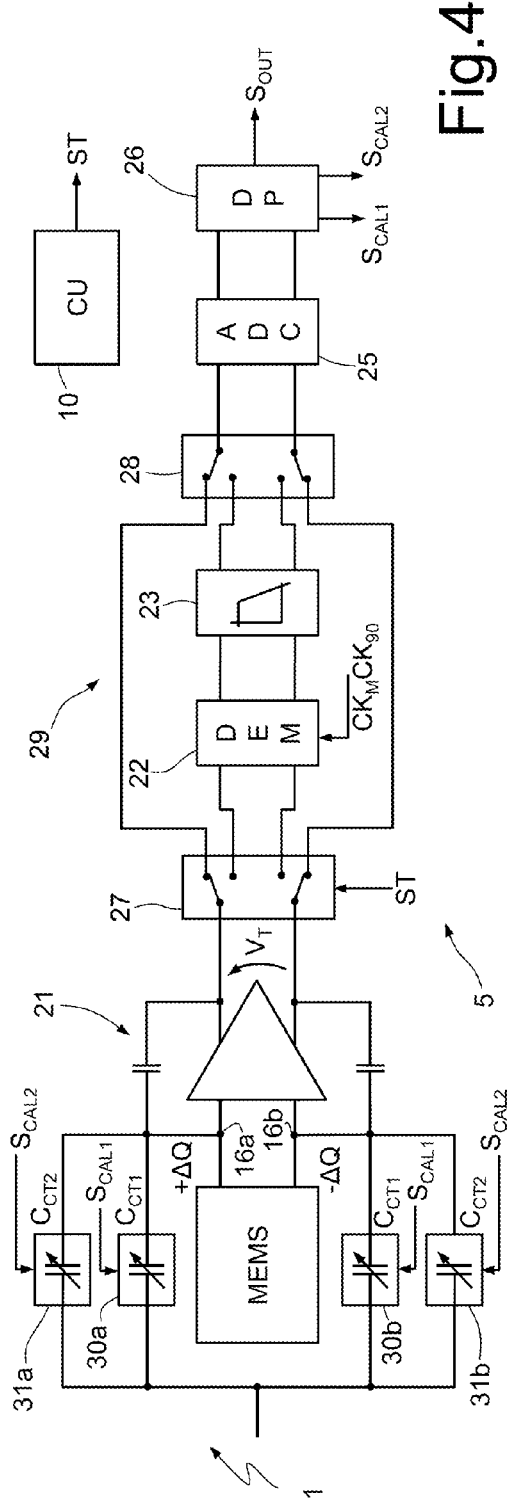
FIG. 4 is a more detailed block diagram of the gyroscope of FIG. 1 in a second operating configuration.

As illustrated in FIGS. 3 and 4, in one embodiment the reading device 5 comprises a read interface 21 and a processing chain 29, forming part of which are a demodulator 22, a lowpass filter 23, an analog-to-digital converter 25, and a digital-processing module 26. A first selector 27 and a second selector 28, governed by the control unit 10, enable alternatively insertion into and exclusion from the processing chain 29 of the demodulator 22 and the lowpass filter 23, as described in detail hereinafter. In addition, the reading device 5 comprises capacitive offset-compensation modules 30a, 30b and capacitive quadrature-compensation modules 31a, 31b, connected to respective inputs of the read interface 21.

Capacitances $C_{CT1}$ of the capacitive offset-compensation modules 30a, 30b and capacitances $C_{CT2}$ of the capacitive quadrature-compensation modules 31a, 31b are variable. The capacitive offset-compensation modules 30a, 30b and the capacitive quadrature-compensation modules 31a, 31b are for example defined by sets of capacitors that can be alternatively inserted and excluded for modifying the overall capacitance. Configuration registers may be used for setting a status (inserted or excluded) of each capacitor. The capacitive offset-compensation module 30a and the capacitive quadrature-compensation module 31a are in parallel with respect to one another; likewise, the capacitive offset-compensation module 30b and the capacitive quadrature-compensation module 31b are in parallel with respect to one another.

The read interface 21 is a fully differential switched-capacitor charge amplifier and is connected to the sensing terminals 16a, 16b for receiving electrical sensing signals $\pm\Delta Q$ (charge packets in the embodiment described).

The read interface 21 is configured to convert the electrical sensing signals $\pm\Delta Q$ into a transduction signal $V_T$.

The terminals of the read interface 21 are alternatively connectable to respective inputs of the demodulator 22 through the first selector 27, in a first operating configuration (FIG. 3), and to the analog-to-digital converter 25 through the first selector 27 and the second selector 28, in a second operating configuration (FIG. 4).

The demodulator 22 is arranged downstream of the read interface 21. The inputs of the demodulator 22 in the first operating configuration are connected to the read interface 21 and, in the second operating configuration, are floating. The demodulator 22 moreover has demodulation inputs, for receiving the master clock signal $CK_M$ and the quadrature clock signal $CK_{90}$, and outputs connected to respective inputs of the lowpass filter 23. The demodulator 22 receives transduction signals $V_T$ from the read interface 21 and, in ordinary operating conditions (i.e., outside the calibration procedures described hereinafter), multiplies them by the master clock signal $CK_M$.

The outputs of the lowpass filter 23 are connected to the analog-to-digital converter 25 through the second selector 28 in the first operating configuration and are floating in the second operating configuration. The lowpass filter 23 selects a band containing the component of the demodulated signals $V_D$, which is proportional to the angular velocity of the microstructure 2 about the sensing axis.

The first selector 27 and the second selector 28 are governed by the control unit 10 through a status signal ST, which has a first value in conditions of normal operation of the gyroscope 1 and during a procedure for calibration of the quadrature errors and a second value during an offset-calibration procedure.

The digital-processing module 26 processes the demodulated signals $V_D$ as required by the application for which the gyroscope 1 is used and supplies the output signal $S_{OUT}$. The digital-processing module 26 is moreover configured to supply an offset-calibration signal $S_{CAL1}$, for calibrating the offset of the microstructure 2, and a second calibration signal $S_{CAL2}$, for calibrating the quadrature errors. In one embodiment, the offset-calibration signal $S_{CAL1}$ and the second calibration signal $S_{CAL2}$ are digital words that are written in the configuration registers (not illustrated) of the capacitive offset-compensation modules 30a, 30b and of the capacitive quadrature-compensation modules 31a, 31b for setting the capacitance thereof.

The control unit 10 determines the mode of operation of the gyroscope 1 and, in particular, executes the procedures for offset calibration and quadrature-error calibration during a step of start-up of the gyroscope 1.

Figure 5:
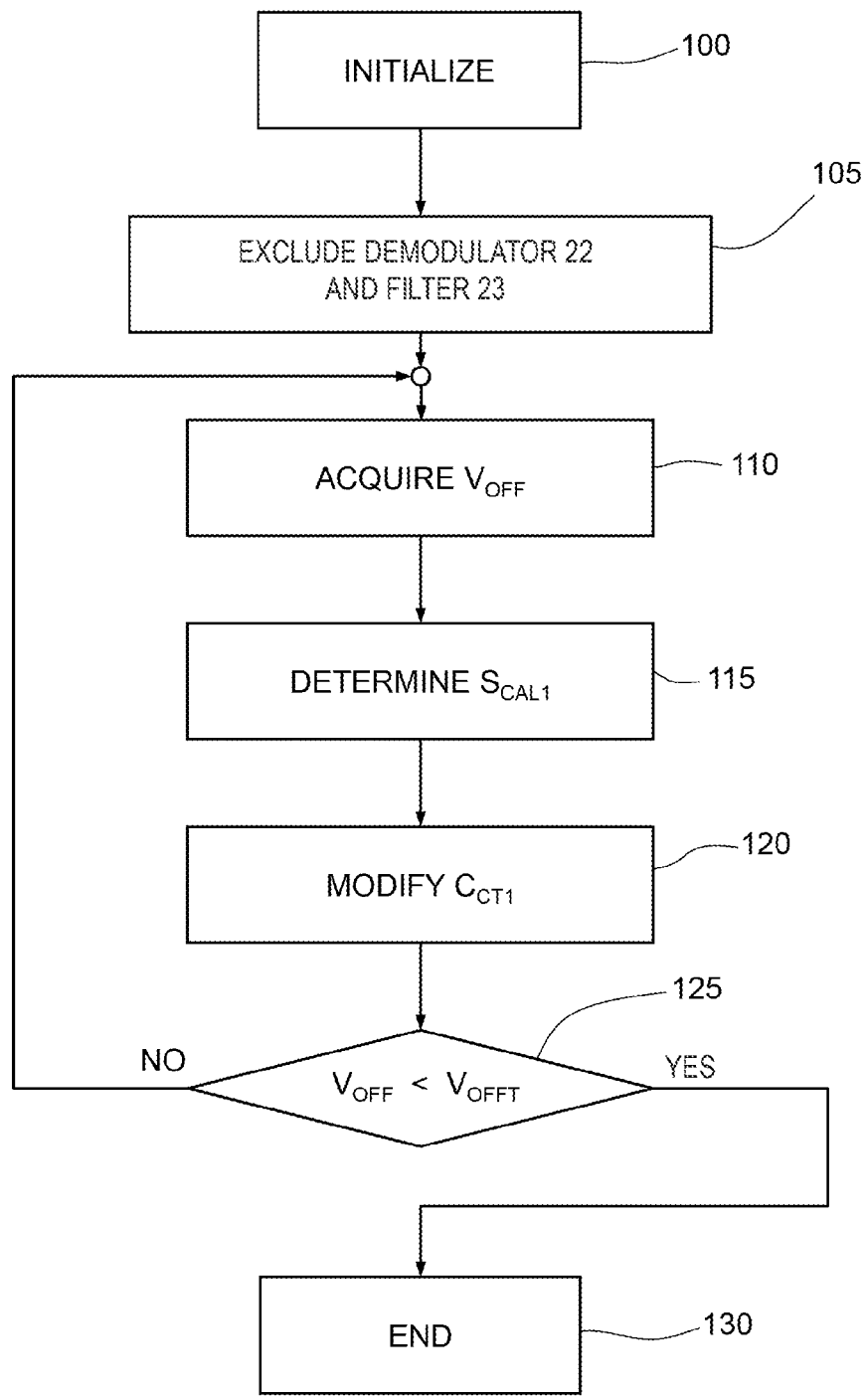
FIG. 5 is a flowchart regarding a first calibration procedure performed by the gyroscope of FIG. 1.

With reference to FIG. 5, upon turning-on of the gyroscope 1 (block 100) the control unit 10 executes initialization steps, in particular by loading portions of control code from an integrated nonvolatile memory (not illustrated). In this step, the driving device 3 is turned off, and the driving mass 7 is at rest. Consequently, on the output of the read interface 21 there is in any case no signal contribution due to rotation of the gyroscope 1. On account of driving, in fact, the signals at output from the read interface 21 present as signals having a carrier frequency equal to the driving frequency and modulated in amplitude by the angular velocity about the sensing axis. In the absence of driving, instead, the transduction signals $V_T$ on the output of the read interface 21 comprise only a d.c. contribution of offset voltage $V_{OFF}$ caused by the offsets of the microstructure 2.

The control unit 10 sets the first selector 27 and the second selector 28 in the second operating configuration (block 105), thus excluding the demodulator 22 and the lowpass filter 23. The outputs of the read interface 21 are then connected to the analog-to-digital converter 25 through the first selector 27 and the second selector 28.

Hence, with the driving device 3 turned off, the digital-processing module 26 acquires from the analog-to-digital converter 25 the value of the offset voltage $V_{OFF}$ present on the outputs of the read interface 21 (block 110) and, on the basis of the sign and the amplitude of the offset voltage $V_{OFF}$, determines a value of compensation of the offset-calibration signal $S_{CAL1}$ to be applied to the capacitive offset-compensation modules 30a, 30b to eliminate or reduce the offset voltage $V_{OFF}$ itself (block 115). In one embodiment, the value of the offset voltage $V_{OFF}$ is determined on the basis of the average of a pre-set number of samples.

The capacitance $C_{CT1}$ of the capacitive offset-compensation modules 30a, 30b is then modified on the basis of the offset-calibration signal $S_{CAL1}$ thus determined (block 120).

Finally, if the offset voltage $V_{OFF}$ is lower than a threshold $V_{OFFT}$ (output YES from block 125), the offset-calibration procedure is terminated (block 130); otherwise (output NO from block 125), the steps of acquisition of the value of the offset voltage $V_{OFF}$ (block 110), for selection of a value of compensation of the offset-calibration signal $S_{CAL1}$ (block 115), and for modification of the capacitance $C_{CT1}$ of the capacitive offset-compensation modules 30a, 30b (block 120) is repeated iteratively until the threshold $V_{OFFT}$ is reached.

Figure 6:
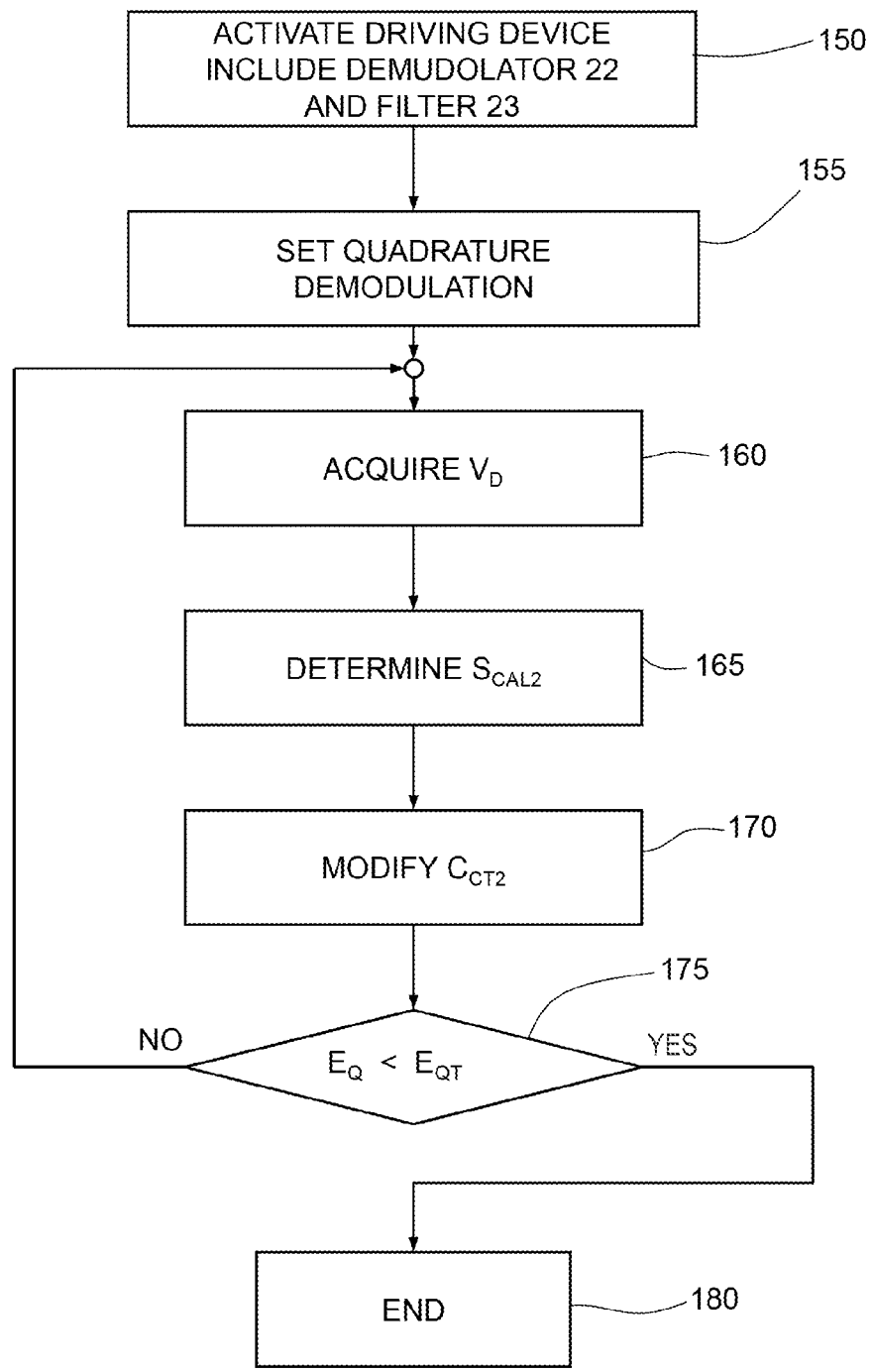
FIG. 6 is a flowchart regarding a second calibration procedure performed by the gyroscope of FIG. 1.

If necessary, the control unit 10 co-ordinates the components of the gyroscope 1 for performing, in a subsequent step, the quadrature-error calibration procedure, as illustrated with reference to FIG. 6.

Once the driving device 3 has been started up and the oscillations of the microelectromechanical loop 19 have reached a steady-state condition (block 150), the control unit 10 sets the first selector 27 and the second selector 28 in the first operating configuration. The demodulator 22 and the lowpass filter 23 are then connected in cascaded mode between the read interface 21 and the analog-to-digital converter 25.

The demodulator 22 is set by the control unit 10 for quadrature demodulation of the transduction signals $V_T$ by multiplication for the quadrature clock signal $CK_{90}$ (block 155).

The baseband harmonic content of the demodulated signals $V_D$ (i.e., what is not suppressed by the lowpass filter 23) is basically determined by the quadrature errors, which depend, for example, upon imprecisions in the coupling of the driving mass 7 to the supporting structure 6.

The digital-processing module 26 acquires from the analog-to-digital converter 25 the demodulated signals $V_D$ that are filtered and discretized (block 160) and uses them for determining a value of compensation of the second calibration signal $S_{CAL2}$ to be applied to the capacitive quadrature-compensation modules 31a, 31b for eliminating or reducing the quadrature error (block 165).

The capacitance $C_{CT2}$ of the capacitive quadrature-compensation modules 31a, 31b is then modified on the basis of the second calibration signal $S_{CAL2}$ thus determined (block 170).

Finally, if the quadrature error $E_Q$ is lower than a threshold $E_{QT}$ (output YES from block 175), the calibration procedure is terminated (block 180); otherwise (output NO from block 175), the steps of acquisition of the filtered demodulated signals $V_D$ (block 160), for selection of a value of compensation of the second calibration signal $S_{CAL2}$ (block 165) and for modification of the capacitance $C_{CT2}$ of the capacitive quadrature-compensation modules 31a, 31b (block 170) is repeated iteratively until the threshold $E_{QT}$ is reached.

The gyroscope described advantageously enables execution of calibration procedures at any stage of the service life of the device and not only in the factory. By the procedures described herein, it is hence possible to recover the drifts of the systematic errors (offset and quadrature error) even when external factors (such as variations of temperature) or ageing intervene to alter the calibration performed in the factory.

The calibration can moreover be performed in a way practically transparent for the user and, in the embodiment described herein, practically does not require additional components (if not the selectors for including and excluding the demodulator and the lowpass filter). Offset calibration, in particular, can be performed during turning-on of the device, as described, and for this reason it is not necessary to suspend use of the gyroscope.

Figure 7:
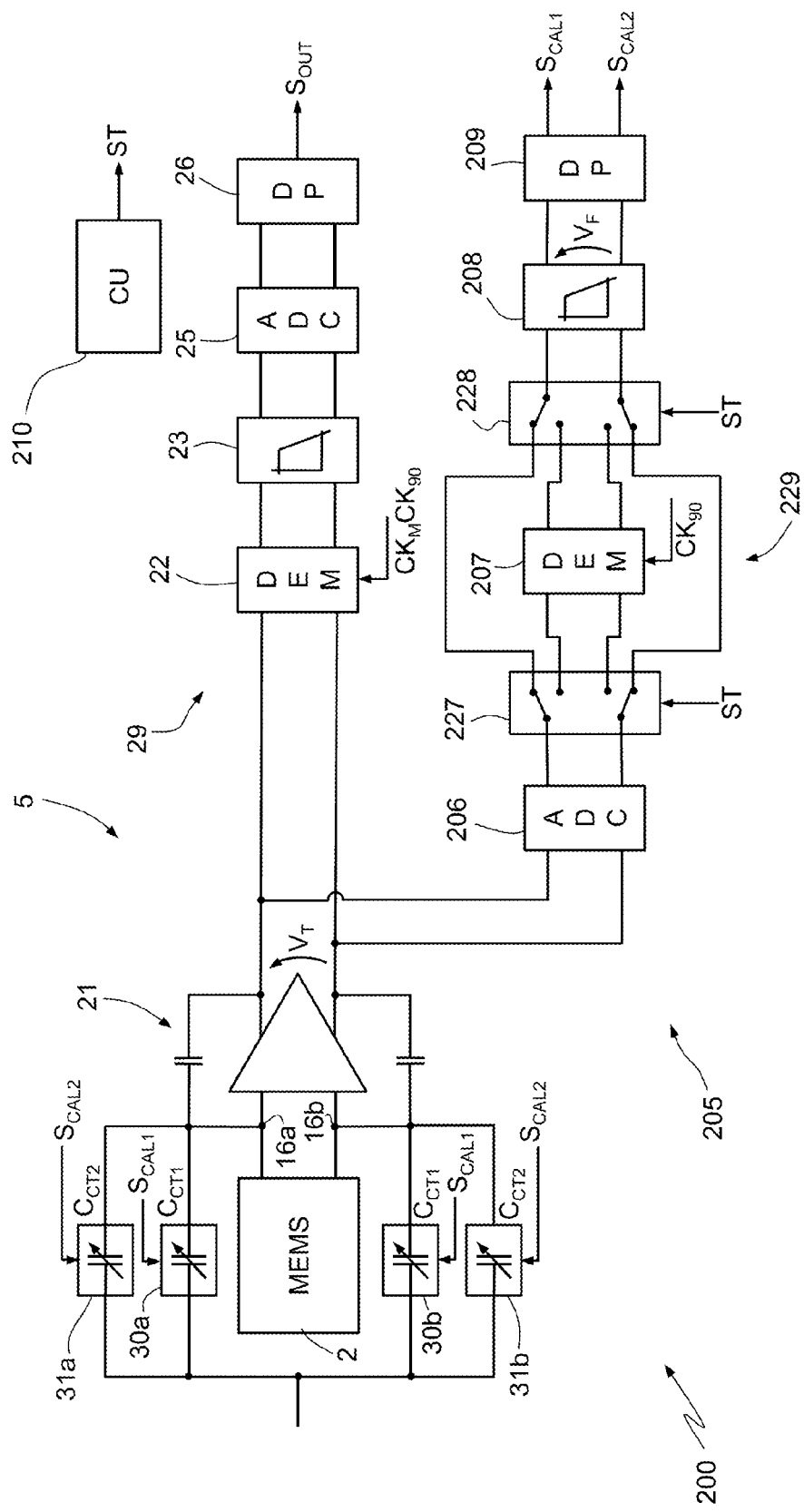
FIG. 7 is a simplified block diagram of a microelectromechanical gyroscope in accordance with a different embodiment of the present disclosure, in a first operating configuration.
Figure 8:
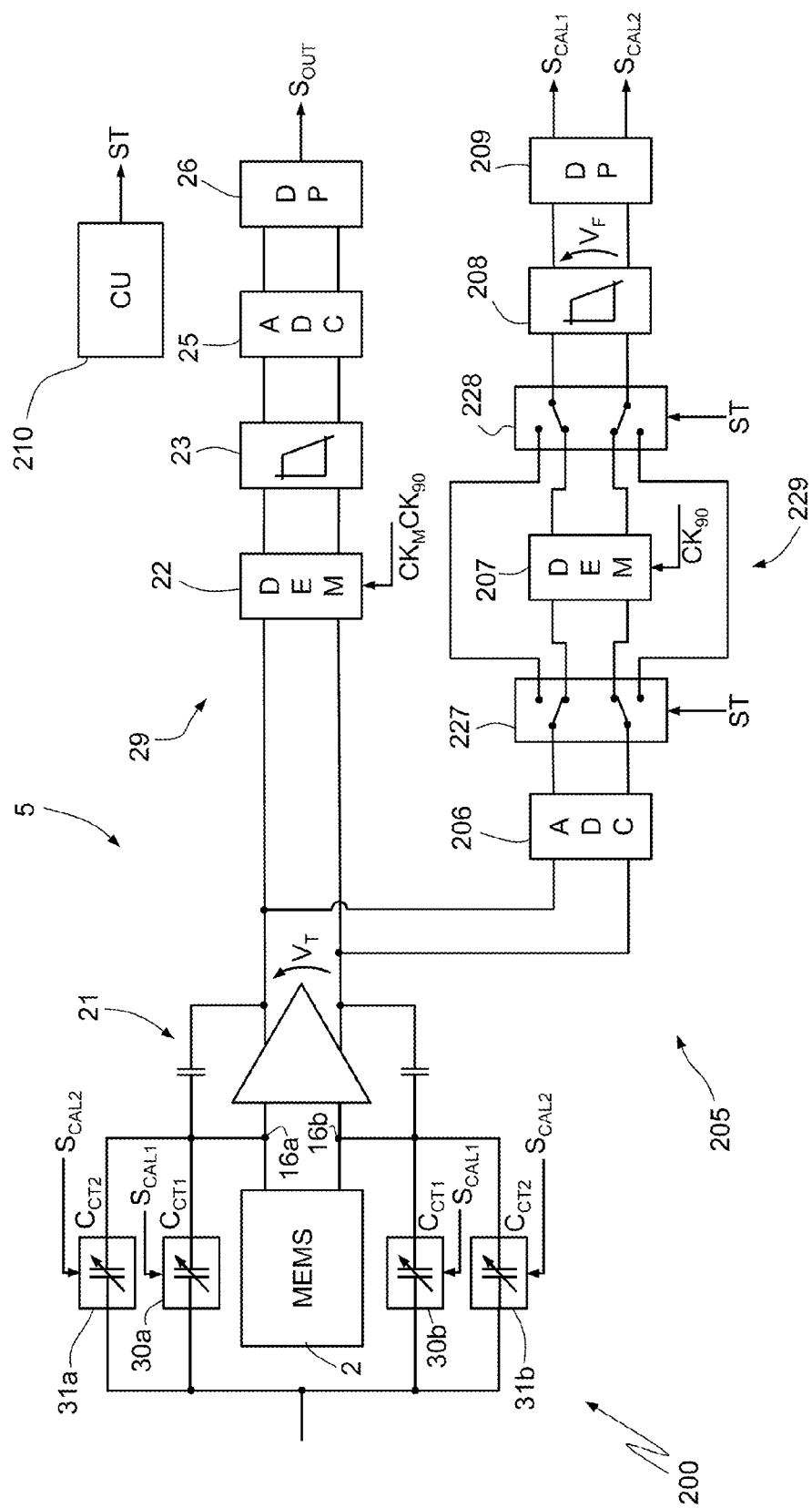
FIG. 8 is a simplified block diagram of the gyroscope of FIG. 7 in a second operating configuration.

FIGS. 7 and 8, in which parts that are the same as the ones already described are designated by the same reference numbers, show a gyroscope 200 according to a different embodiment of the disclosure.

The gyroscope 200 comprises the microstructure 2, with the driving mass 7 and the sensing mass 8, the driving device 3 and the reading device 5, without, however, the selectors 27, 28 (the read interface 21 is hence connected to the demodulator 22, and the lowpass filter 23 is connected to the analog-to-digital converter 25).

The gyroscope 200 further comprises a control unit 210 and a calibration stage 205. In turn, it comprises an analog-to-digital converter 206, a demodulator 207, a lowpass filter 208, and a digital-processing module 209, which define a processing chain 229.

The analog-to-digital converter 206 is connected to the outputs of the read interface 21 of the reading device 5. The demodulator 207, the lowpass filter 208, and the digital-processing module 209 are connected in cascaded mode to the analog-to-digital converter 206.

The demodulator 207 can be alternatively inserted into and excluded from the processing chain 229 by a first selector 227 and a second selector 228, controlled by the control unit 210 through a status signal ST. In a first operating configuration (FIG. 7), corresponding to a first value of the status signal ST, the demodulator 207 is excluded from the processing chain 229, and outputs of the analog-to-digital converter 206 are connected to the lowpass filter 208 through the selectors 227, 228. In a second operating configuration (FIG. 8), corresponding to a second value of the status signal ST, the demodulator 207 is instead inserted in the processing chain 229, between the analog-to-digital converter 206 and the lowpass filter 208.

The digital-processing module 209 is configured to supply an offset-calibration signal $S_{CAL1}$, for calibrating the offset of the microstructure 2, and a second calibration signal $S_{CAL2}$, for calibrating the quadrature errors. In one embodiment, the offset-calibration signal $S_{CAL1}$ and the second calibration signal $S_{CAL2}$ are digital words that are written in the configuration registers (not illustrated) of the capacitive offset-compensation modules 30a, 30b and of the capacitive quadrature-compensation modules 31a, 31b for setting the capacitance thereof.

The gyroscope 200 can carry out procedures for calibrating the offset of the microstructure 2 and the quadrature errors as described hereinafter.

The control unit 210 starts the offset-calibration procedure with the driving device 3 functioning and oscillations of the microelectromechanical loop 19 stable in steady-state conditions, excluding the demodulator 207 from the processing chain 229 of the calibration device 205 (FIG. 7).

The analog-to-digital converter 206 receives and discretizes the transduction signals $V_T$ supplied by the read interface 21, which are then supplied to the digital-processing module 209.

In these conditions, the transduction signals $V_T$ are not demodulated and contain a d.c. component, determined by the offset, and a component which is centered around the driving frequency $\omega_D$ and amplitude-modulated by the angular velocity of the microstructure 2 about the sensing axis. The latter component is suppressed by the lowpass filter 208 and then the filtered transduction signals $V_F$ received by the digital-processing module 209 substantially contain only the d.c. component, which is indicative of the offset.

On the basis of the transduction signals $V_T$ after filtering, the digital-processing module 209 determines a value of compensation of the offset-calibration signal $S_{CAL1}$ to be applied to the capacitive offset-compensation modules 30a, 30b for eliminating or reducing the offset voltage $V_{OFF}$ itself. The capacitance $C_{CT1}$ of the capacitive offset-c ompensation modules 30a, 30b is then modified accordingly, substantially as described previously. The procedure may be repeated iteratively if necessary, until the offset drops below a threshold.

To perform calibration procedure of the quadrature-error, the control unit 210 sets the second value of the status signal ST for including the demodulator 207 in the processing chain 229 of the calibration stage 205. Moreover, the quadrature clock signal $CK_{90}$ is supplied to the demodulator 207. Quadrature demodulation enables the component of the transduction signals $V_T$ due to the quadrature error to be brought back into baseband, whereas the (d.c.) offset component is brought to the driving frequency $\omega_D$. The subsequent filtering of the lowpass filter 209 enables elimination of the components at the driving frequency $\omega_D$ and at higher frequencies. The signals received by the digital-processing module 209 hence indicate just the quadrature error and are used for determining a value of compensation of the second calibration signal $S_{CAL2}$ to be applied to the capacitive quadrature-compensation modules 31a, 31b for eliminating or reducing the quadrature error itself.

Also in this case, the procedure can be repeated iteratively until the quadrature error is reduced below a threshold.

The procedures for calibrating the offset of the microstructure 2 and the quadrature errors can be performed in a way altogether transparent to the user, even during normal operation of the gyroscope 200.

In fact, the calibration stage 205 does not interfere with operation of the reading device 5, limiting itself to acquiring the transduction signals. The calibration can then be performed without suspending ordinary use of the gyroscope 200. The transparency to the user is a characteristic that is always desirable, but is particularly advantageous in critical applications, where the temporary absence of data from the gyroscope 200 can have a negative consequence.

Figure 9:
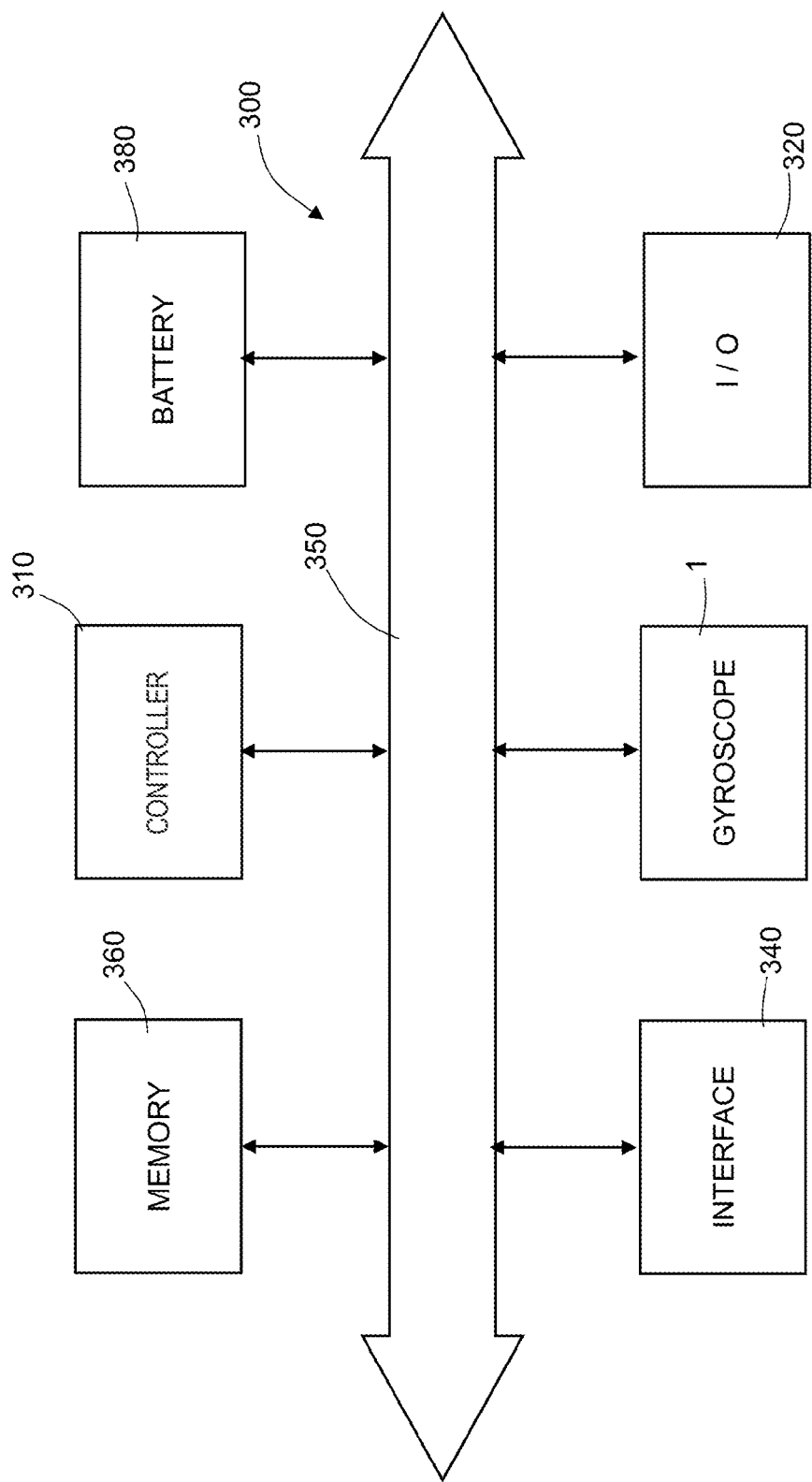
FIG. 9 is a simplified block diagram of an electronic system incorporating a microelectromechanical sensor according to one embodiment of the present disclosure.

Illustrated in FIG. 9 is a portion of an electronic system 300 in accordance with one embodiment of the present disclosure. The system 300 incorporates the gyroscope 1 and may be used in devices such as, for example, a palmtop computer (personal digital assistant, PDA), a laptop or portable computer, possibly with wireless capacity, a cell phone, a messaging device, a digital music player, a digital camera, or other devices designed to process, store, transmit, or receive information. For instance, the gyroscope 1 may be used in a digital camera for detection of movements and carry out an image stabilization. In a further embodiment, the gyroscope 1 is included in a user interface activated by movement for computers or a console for videogames. In a further embodiment, the gyroscope 1 is incorporated in a satellite navigation device and is used for temporary position tracking in the event of loss of the satellite positioning signal.

The electronic system 300 may comprise a controller 310, an input/output (I/O) device 320 (for example, a keyboard or a screen), the gyroscope 1, a wireless interface 340, and a memory 360 of a volatile or nonvolatile type, coupled together through a bus 350. In one embodiment, a battery 380 may be used to supply the system 300. It is to be noted that the scope of the present disclosure is not limited to embodiments having necessarily one or all of the devices listed.

The controller 310 may comprise, for example, one or more microprocessors, microcontrollers, and the like.

The I/O device 320 may be used for generating a message. The system 300 may use the wireless interface 340 for transmitting and receiving messages to and from a wireless communication network with a radiofrequency (RF) signal. Examples of wireless interface may comprise an antenna, a wireless transceiver, such as a dipole antenna, although the scope of the present disclosure is not limited from this standpoint. Furthermore, the I/O device 320 may supply a voltage representing what is stored either in the form of digital output (if digital information has been stored) or in the form of analog information (if analog information has been stored).

Modifications and variations may be made to the gyroscope and to the method described, without thereby departing from the scope of the present disclosure.

In particular, the self-calibration can be exploited in multiaxial gyroscopes. In this case, the components necessary for calibration can be used in time division for each of the sensing axes.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope, comprising:
a supporting structure having first and second sensing terminals;
a capacitive coupling coupled to the sensing terminals;
a sensing mass coupled to the supporting structure through the capacitive coupling, the sensing mass being movable with respect to the supporting structure according to a first degree of freedom and being movable with respect to the supporting structure according to a second degree of freedom in response to rotations of the supporting structure about an axis;
driving components configured to maintain the sensing mass in oscillation according to the first degree of freedom;
a reading interface connected to the sensing terminals and configured to sense transduction signals indicative of the capacitance between the sensing mass and the supporting structure; and
first and second capacitive compensation modules connected to the first and second sensing terminals, respectively, and configured to compensate for a capacitance of the capacitive coupling between the sensing mass and the supporting structure, the first capacitive compensation module having a first variable capacitance coupled to the first sensing terminal, the second capacitive compensation module having a second variable capacitance coupled to the second sensing terminal, and the first and second variable capacitances being distinct from the capacitance of the capacitive coupling between the sensing mass and the supporting structure; and
calibration components coupled to the reading interface and configured to detect systematic errors from the transduction signals and to adjust the first and second variable capacitances of the first and second capacitive compensation modules as a function of the transduction signals to mitigate the systematic errors.

2. The gyroscope according to claim 1, further comprising a control unit configured to selectively activate and deactivate the driving components.

3. The gyroscope according to claim 2, wherein the calibration components include a signal processor configured to determine a compensation value as a function of the transduction signals and vary the first and second variable capacitances based on the compensation value.

4. The gyroscope according to claim 3, wherein:
the signal processor is configured to determine the compensation value as an offset compensation value in a first mode of operation during which the driving components are deactivated by the control unit;
the first and second capacitive compensation modules include first and second offset capacitive compensation modules, respectively; and
the control unit is configured to adjust the first and second offset capacitive compensation modules as a function of the offset compensation value.

5. The gyroscope according to claim 4, wherein:
the calibration components include a low-pass filter coupled to the reading interface, the low-pass filter being configured to receive the transduction signals from the reading interface and to provide filtered transduction signals; and
the processing module is configured to determine an offset compensation value based on the filtered transduction signals in a second mode of operation during which the driving components are activated by the control unit.

6. The gyroscope according to claim 4, wherein:
the signal processor is configured to determine a quadrature compensation value in a second mode of operation during which the driving components are activated by the control unit;

the first and second capacitive compensation modules include first and second quadrature capacitive compensation modules, respectively; and the control unit is configured to adjust the first and second quadrature capacitive compensation modules as a function of the quadrature compensation value.

7. The gyroscope according to claim 6, wherein:
the driving components are configured to provide a main clock signal synchronous with oscillations of the sensing mass and a quadrature clock signal that is 90° out of phase with respect to the main clock signal;
the calibration components include a demodulator configured to demodulate the transduction signals using the quadrature clock signal and to provide demodulated transduction signals; and
the signal processor is configured to determine the quadrature compensation value as a function of the demodulated transduction signals.

8. The gyroscope according to claim 7, wherein the demodulator is selectively connectable between the reading interface and the signal processor.

9. The gyroscope according to claim 1, further comprising a processing chain coupled to the reading interface, the processing chain being configured to generate output signals as a function of the transduction signals.

10. The gyroscope according to claim 9, wherein at least some of the calibration components are shared with the processing chain.

11. The gyroscope according to claim 9, wherein the calibration components are distinct from the processing chain.

12. The gyroscope according to claim 1, wherein:
the first capacitive compensation module includes plural first capacitors that are selectively connected to or disconnected from the first sensing terminal as a function of the transduction signals; and
the second capacitive compensation module includes plural second capacitors that are selectively connected to or disconnected from the second sensing terminal as a function of the transduction signals.

13. The gyroscope according to claim 1, wherein the calibration components include:
a demodulator configured to demodulate the transduction signals and to provide demodulated transduction signals;
a signal processor configured to determine an offset compensation value as a function of the transduction signals in a first operating mode and determine a quadrature compensation value as a function of the demodulated transduction signals in a second operating mode;
a first selector configured to electrically couple the demodulator to the reading interface during the second operating mode and electrically decouple the demodulator from the reading interface during the first operating mode; and
a second selector configured to electrically couple the demodulator to the signal processor during the second operating mode and electrically decouple the demodulator from the signal processor during the first operating mode.

14. An electronic system, comprising:
a control unit, and
a gyroscope coupled to the control unit, the gyroscope, including:
a supporting structure having first and second sensing terminals;
a capacitive coupling coupled to the sensing terminals;
a sensing mass coupled to the supporting structure through the capacitive coupling, the sensing mass being movable with respect to the supporting structure according to a first degree of freedom and being movable with respect to the supporting structure according to a second degree of freedom in response to rotations of the supporting structure about an axis;
driving components configured to maintain the sensing mass in oscillation according to the first degree of freedom;
a reading interface connected to the sensing terminals and configured to sense transduction signals indicative of the capacitance between the sensing mass and the supporting structure; and
first and second capacitive compensation modules connected to the first and second sensing terminals, respectively, and configured to compensate for a capacitance of the capacitive coupling between the sensing mass and the supporting structure, the first capacitive compensation module having a first variable capacitance coupled to the first sensing terminal, the second capacitive compensation module having a second variable capacitance coupled to the second sensing terminal, and the first and second variable capacitances being distinct from the capacitance of the capacitive coupling between the sensing mass and the supporting structure; and
calibration components coupled to the reading interface and configured to detect systematic errors from the transduction signals and to adjust the first and second variable capacitances of the first and second capacitive compensation modules as a function of the transduction signals to mitigate the systematic errors.

15. The system of claim 14, wherein the control unit is configured to selectively activate and deactivate the driving components.

16. The system of claim 14, wherein:
the calibration components include a signal processor configured to determine an offset compensation value as a function of the transduction signals in a first mode of operation;
the control unit is configured to deactivate the driving components during the first mode of operation;
the first and second capacitive compensation modules comprise first and second offset capacitive compensation modules, respectively; and
the control unit is configured to adjust the first and second offset capacitive compensation modules as a function of the offset compensation value.

17. The system of claim 16, wherein:
the signal processor is configured to determine a quadrature compensation value as a function of the transduction signals in a second mode of operation;
the control unit is configured to activate the driving components during the second mode of operation;
the first and second capacitive compensation modules include first and second quadrature capacitive compensation modules, respectively; and
the control unit is configured to adjust the first and second quadrature capacitive compensation modules as a function of the quadrature compensation value.

18. The system of claim 17, wherein:
the driving components are configured to provide a main clock signal synchronous with oscillations of the sensing mass and a quadrature clock signal that is 90° out of phase with respect to the main clock signal;

the calibration components include a demodulator configured to demodulate the transduction signals using the quadrature clock signal and to provide demodulated transduction signals; and the signal processor is configured to determine the quadrature compensation value as a function of the demodulated transduction signals.

19. The system of claim 16, wherein:

the calibration components include a low-pass filter coupled to the reading interface, the low-pass filter being configured to receive the transduction signals from the reading interface and to provide filtered transduction signals;

the signal processor is configured to determine an offset compensation value on the basis of the filtered transduction signals in a second mode of operation; and the control unit is configured to activate the driving components during the second anode of operation.

20. The system according to claim 14, wherein:

the first capacitive compensation module includes plural first capacitors that are selectively connected to or disconnected from the first sensing terminal as a function of the transduction signals; and the second capacitive compensation module includes plural second capacitors that are selectively connected to or disconnected from the second sensing terminal as a function of the transduction signals.

21. A method, comprising:

calibrating a microelectromechanical gyroscope, the calibrating including:

oscillating a sensing mass in a first degree of freedom with driving components;

sensing, through a reading interface, transduction signals indicative of capacitive coupling between the sensing mass and supporting structure, the sensing mass being movable with respect to the supporting structure according to the first degree of freedom and being movable with respect to the supporting structure according to a second degree of freedom in response to rotations of the supporting structure about an axis; and compensating for a capacitance of the capacitive coupling between the sensing mass and the supporting structure, the compensating including:

detecting systematic errors from transduction signals; and adjusting first and second variable capacitances of first and second capacitive compensation modules as a function of the transduction signals, so as to mitigate the systematic errors, the first and second variable capacitances being respectively coupled to first and second sensing terminal of the reading interface and being distinct from the capacitance of the capacitive coupling between the sensing mass and the supporting structure.

22. The method according to claim 21, wherein detecting systematic errors from the transduction signals includes deactivating the driving components during a first mode of operation, and sensing the transduction signals with the driving components deactivated.

23. The method according to claim 22, wherein detecting systematic errors from transduction signals includes:

activating the driving components and the transduction signals during a second mode of operation;

providing a main clock signal, synchronous with the oscillations of the sensing mass, and a quadrature clock signal, 90° out of phase with respect to the main clock signal; and demodulating the transduction signals using the quadrature clock signal.

24. The method according to claim 21, wherein the first capacitive compensation module includes plural first capacitors, the second capacitive compensation module includes plural second capacitors, and the adjusting includes selectively coupling the first and second capacitors to the reading interface as a function of the transduction signals.

* * * * *